United States Patent

Berezin

(10) Patent No.: US 7,139,025 B1
(45) Date of Patent: Nov. 21, 2006

(54) ACTIVE PIXEL SENSOR WITH MIXED ANALOG AND DIGITAL SIGNAL INTEGRATION

(75) Inventor: Vladimir Berezin, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/183,389

(22) Filed: Oct. 29, 1998

(51) Int. Cl.
*H04N 3/14* (2006.01)
*H04N 5/335* (2006.01)

(52) U.S. Cl. .................................. 348/308
(58) Field of Classification Search ........... 348/231, 348/241, 308, 297, 298, 302, 316
See application file for complete search history.

(56) References Cited

U.S. PATENT DOCUMENTS

| | | | | |
|---|---|---|---|---|
| 4,453,177 A * | 6/1984 | Berger et al. | ............... | 348/316 |
| 4,710,817 A * | 12/1987 | Ando | ........................ | 348/241 |
| 5,113,263 A * | 5/1992 | Audaire et al. | ............. | 348/303 |
| 5,248,971 A * | 9/1993 | Mandl | ......................... | 348/311 |
| 5,376,811 A * | 12/1994 | Ikeda | ......................... | 348/305 |
| 5,481,301 A * | 1/1996 | Cazaux et al. | ............. | 348/311 |
| 5,486,858 A * | 1/1996 | Knupfer | ..................... | 348/297 |
| 5,665,959 A * | 9/1997 | Fossum et al. | ............ | 348/298 |
| 5,856,829 A * | 1/1999 | Gray et al. | ................. | 345/422 |
| 5,886,659 A * | 3/1999 | Pain et al. | ................... | 348/292 |
| 5,892,541 A * | 4/1999 | Merrill | ....................... | 348/304 |
| 5,923,369 A * | 7/1999 | Merrill et al. | ............. | 348/308 |
| 6,115,065 A * | 9/2000 | Yadid-Pecht et al. | ....... | 348/308 |
| 6,377,303 B1 * | 4/2002 | O'Connor | .................... | 348/308 |
| 6,466,265 B1 * | 10/2002 | Lee et al. | .................... | 348/308 |
| 6,583,817 B1 * | 6/2003 | Lee | ............................. | 348/241 |
| 2003/0058345 A1* | 3/2003 | Morris et al. | .......... | 348/207.99 |
| 2003/0117520 A1* | 6/2003 | Fossum et al. | ............. | 348/308 |

* cited by examiner

*Primary Examiner*—Tuan Ho
*Assistant Examiner*—Jason Whipkey
(74) *Attorney, Agent, or Firm*—Dickstein Shapiro LLP

(57) ABSTRACT

An active pixel sensor includes mixed analog and digital signal integration on the same substrate. The analog part of the array forms the active pixel sensor, and the digital part of the array does digital integration of the signal.

19 Claims, 2 Drawing Sheets

BLOCK DIAGRAM OF APS WITH MIXED
ANALOG AND DIGITAL SIGNAL INTEGRATION

ACTIVE PIXEL SENSOR WITH MIXED ANALOG AND DIGITAL SIGNAL INTEGRATION

BACKGROUND

Active pixel sensors are well known in the art. A basic description of the active pixel sensors found in U.S. Pat. No. 5,471,515, the disclosure of which is incorporated by reference to the extent necessary for proper understanding.

An active pixel sensor, and many other image sensors, have inherent trade-offs. Typically, the trade-off is made between sensitivity, versus motion resolution, versus space resolution.

For example, we obtain sensitivity by increasing the integration time. However, with a higher integration time, motion becomes more choppy, and hence motion sensitivity is decreased. Sensitivity can also be increased by increasing the pixel size. However, space resolution then decreases, again supporting the trade-off.

Integrated circuit designers continually attempt to put more circuitry on a chip. Lines on the chip are becoming smaller: for example, current technology may use a 0.11 micron process for digital circuitry. However, the image sensor, which is effectively analog, may be subject to a physical minimum size. A pixels that has too small a size and/or high gain, would have insufficient capacitance to allow the sensor to obtain the signal to noise ratio required for quality image acquisition.

SUMMARY

The inventor recognized that memory size can form an effective tradeoff against pixel size. The present specification describes receiving information in an analog photosensor array, and integrating that information in on-chip digital memory. According to this system, an analog array is placed on the same substrate with a digital memory. The information from the analog array is sampled periodically, and the integration is carried out in the digital memory.

DESCRIPTION OF THE PREFERRED EMBODIMENTS

Figure 1:
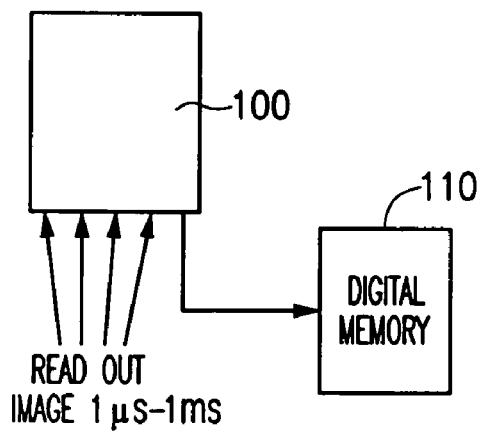
FIG. 1 shows a basic block diagram.

The basic system is shown in FIG. 1. An analog image detector 100, preferably a CMOS image sensor, reads out the image at some time period, e.g., between 1 microsecond and 1 millisecond. Each pixel is coupled to a digital memory 110. Digital memory integrates the instantaneous information received from the pixels.

Current frame times are preferably either approximately 33 milliseconds for a 30-frames per second system, or approximately 16 milliseconds for high motion resolution of 60 frames per second.

In addition to the other advantages noted above, this architecture allows pixel capacitance to be reduced and pixel gain to be increased, since the pixel need provide only instantaneous values, and does not need to integrate the incoming charge.

The signal integration process is divided into two parts: an analog part in the active pixel sensor 100 and a digital part in digital random access memory 110.

Figure 2:
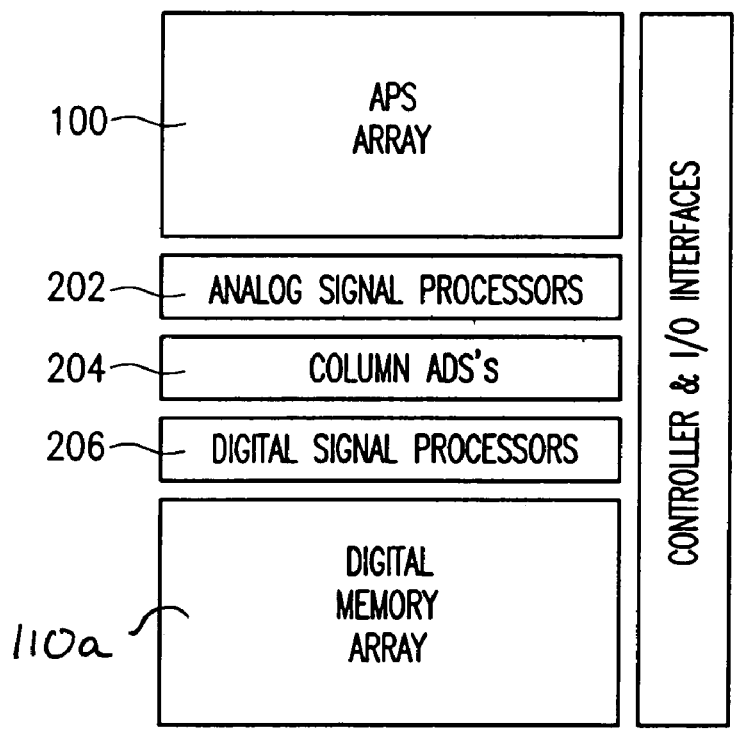
FIGS. 2 and 3 respectively show more detailed block diagrams of the circuitry.

A first embodiment is shown in FIG. 2. FIG. 2 shows the active pixel sensor array 100, coupled with an analog signal processor 202, column A/D converters 204, a digital processor 206, and a digital memory array 110a of the digital memory 110. The analog signal processor 202 includes column analog double sampling circuitry for sampling both signals and references to decrease the pixel fixed pattern noise. Preamplifiers with adjustable gains, can also be used to increase the sensitivity and provide an automatic exposure control, as is known in the art.

The system as described herein uses column parallel A/D conversion, where one separate A/D converter is provided for each column of the active pixel sensor array. In this system, digital integration may be used for oversampling the A/D converter. Digital sampling can reduce the quantization noise density, and hence increase the effective resolution of the system proportionally to arise of the frame bit. Preferably the system operates with an AC input noise of about half of the least significant bit.

Figure 3:
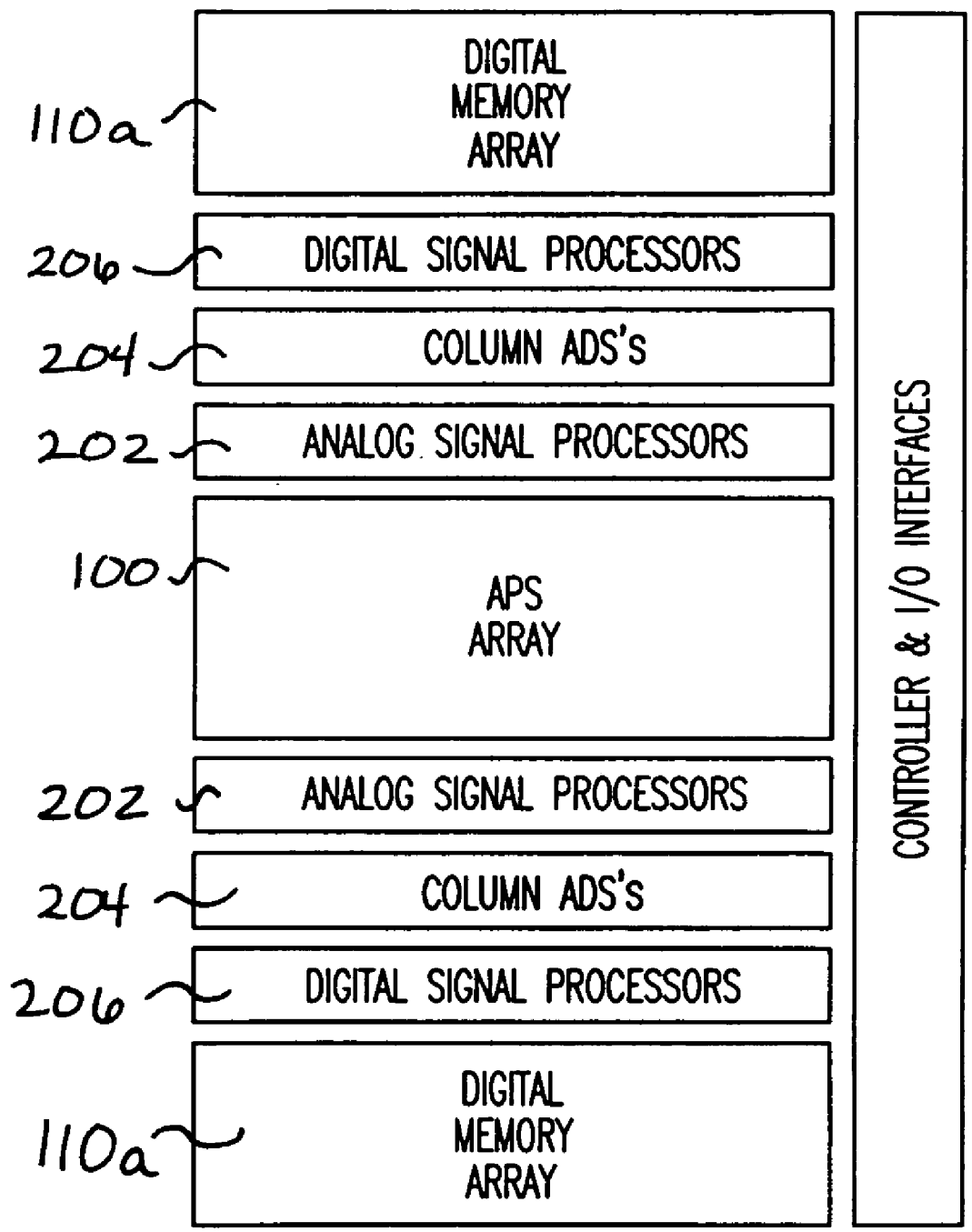

The digital signal processor (DSP) 206 provides arithmetic operations such as addition, subtraction, division, and multiplication, and also includes a buffer memory to maintain intermediate results. DSP 206 can also act to digitally correct column digital fixed pattern noise. FIG. 3 shows a system similar to that in FIG. 2 but with twice as many digital memory arrays 110a and processing circuits 206.

In operation, the sensor is preferably a CMOS image sensor that is of a sufficiently small size that it cannot integrate for a desired frame period. The information from the sensor is sampled by the column A/D converts 204 at an oversampled rate. Each sample is stored in the digital memory array 110a, and the values are integrated in that memory 110a. A digitally integrated value can be subsequently read from the digital memory array 110a.

Although only a few embodiments have been disclosed in detail above, other modifications are possible in the preferred embodiment.

What is claimed is:

1. An imaging system, comprising:
    an active pixel image sensor array disposed on a substrate, said array comprising a plurality of pixels;
    at least one analog to digital converter for sampling and converting analog information from pixels in said array to digital values; and
    a plurality of digital memory arrays disposed on said substrate for storing and accumulating said digital values;
    wherein each pixel in said active pixel image sensor array is sampled multiple times during an integration period and each sampled value is stored in one of said digital memory arrays, said stored values being accumulated and representing a digital integrated value for said integration period of said pixel.

2. The imaging system of claim 1, wherein said active pixel image sensor array is a CMOS image sensor.

3. The imaging system of claim 1, wherein said at least one analog to digital converter is an oversampling converter.

4. The imaging system of claim 1, further comprising an analog signal processor including column analog double sampling circuitry.

5. The imaging system of claim 4, wherein said column analog double sampling circuitry samples both a signal and a reference for decreasing pixel fixed pattern noise.

6. The imaging system of claim 4, wherein said analog signal processor further comprises at least one preamplifier with adjustable gain.

7. The imaging system of claim 1, wherein said at least one analog to digital converter comprises a column analog to digital converter for each pixel column of said active pixel image sensor array.

8. The imaging system of claim 1, further comprising at least one digital signal processor coupled between said at least one analog to digital converter and said one of said plurality of digital memory arrays.

9. The imaging system of claim 8, wherein said represented integrated value is output from said digital memory array.

10. An imaging system as defined in claim 1 wherein said plurality of digital memory arrays comprises two digital memory arrays.

11. An imaging system as defined in claim 10 wherein said two digital memory arrays are disposed on opposite sides of said active pixel image sensor array.

12. The imaging system of claim 11, wherein said first digital memory array is connected through a first analog to digital converter to receive a first set of signals from said pixel image sensor array and said second digital memory array is connected through a second analog to digital converter to receive a second set of signals from said pixel image sensor array.

13. A method of acquiring an image, comprising:
using an active pixel image sensor array including a plurality of pixels to image a scene and to produce analog image information, said active pixel image sensor array being disposed on a semiconductor substrate;
sampling and converting said analog image information for a first pixel of said active pixel image sensor array a plurality of times during a desired integration period to produce a first plurality of digital values;
storing said first plurality of digital values in a first digital memory, said first digital memory being disposed on said semiconductor substrate;
accumulating said first plurality of digital values in said first digital memory, said accumulated first plurality of digital values representing a first digital integrated signal for said integration period of said first pixel;
sampling and converting said analog image information for a second pixel of said active pixel image sensor array a plurality of times during a desired integration period to produce a second plurality of digital values;
storing said second plurality of digital values in a second digital memory, said second digital memory being disposed on said semiconductor substrate; and
accumulating said second plurality of digital values in said second digital memory, said accumulated second plurality of digital values representing a second digital integrated signal for said desired integration period of said second pixel.

14. The method of claim 13, wherein said active pixel image sensor array is a CMOS image sensor.

15. The method of claim 13, further comprising using the stored digital values for each pixel to produce a respective integrated pixel output signal for said integration period.

16. A method of acquiring an image as defined in claim 13 wherein said first and second digital memories are disposed on opposite sides of said active pixel image sensor array.

17. A method of acquiring an image as defined in claim 16, wherein said first digital memory array receives a first set of signals from said pixel image sensor array through a first analog to digital converter and said second digital memory array receives a second set of signals from said pixel image sensor array through a second analog to digital converter.

18. A semiconductor chip, comprising:
a substrate comprising:
an active pixel image sensor array comprising a plurality of pixels;
at least one analog to digital converter for sampling and converting analog information from pixels in said array to digital values; and
a plurality of digital memory arrays for storing and accumulating said digital values;
wherein each pixel in said active pixel image sensor array is sampled multiple times during an integration period and each sampled value is stored and accumulated in one of said digital memory arrays, said accumulated values representing a respective integrated signal for each pixel during said integration period.

19. A semiconductor chip as defined in claim 18 wherein said substrate further comprises:
an analog signal processor coupled to at least one pixel of said plurality of pixels of said active pixel image sensor array; and
a digital signal processor coupled to said analog signal processor and coupled to at least one array of said plurality of digital memory arrays.

* * * * *